US007717611B2

(12) United States Patent
Wang Wu

(10) Patent No.: US 7,717,611 B2
(45) Date of Patent: May 18, 2010

(54) EGG BEATER

(76) Inventor: Ching Yueh Wang Wu, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 12/250,549

(22) Filed: Oct. 14, 2008

(65) Prior Publication Data

US 2010/0091609 A1 Apr. 15, 2010

(51) Int. Cl.
*A47J 43/10* (2006.01)

(52) U.S. Cl. ...................................................... 366/130

(58) Field of Classification Search ................. 366/130; 215/DIG. 8; 277/641; 220/568, 806, 797, 220/798, 795, 304, 213
See application file for complete search history.

(56) References Cited

U.S. PATENT DOCUMENTS 288,775 A * 11/1883 Cherry ....................... 220/568
627,363 A * 6/1899 Taylor ..................... 222/196.5
1,060,419 A * 4/1913 Benjamin ................... 366/130
1,075,119 A * 10/1913 Reichner ..................... 99/508
1,173,422 A * 2/1916 Grannis ...................... 220/806
1,201,284 A * 10/1916 Gilchrist .................. 241/282.2
1,838,636 A * 12/1931 Reid .......................... 220/806
2,010,725 A * 8/1935 Kircher ...................... 220/568
2,592,485 A * 4/1952 Stair .......................... 366/130
2,745,642 A * 5/1956 Hermann .................... 366/130
3,074,263 A * 1/1963 Farmer ........................ 68/213
3,537,605 A * 11/1970 Solowey ..................... 206/222
3,820,692 A * 6/1974 Swett et al. ................ 222/547
4,003,555 A * 1/1977 Swartz ....................... 366/130
4,116,355 A * 9/1978 Munn et al. ................ 220/574
4,347,947 A * 9/1982 Hammes ..................... 220/378
4,818,114 A * 4/1989 Ghavi ......................... 366/130
4,916,672 A * 4/1990 McCrory .................... 366/130
5,358,330 A * 10/1994 Moll .......................... 366/130
5,788,369 A * 8/1998 Tseng ........................ 366/130
6,644,846 B2 * 11/2003 Willat ........................ 366/130
6,913,165 B2 * 7/2005 Linz et al. .................. 220/568
7,441,941 B2 * 10/2008 Vernon ....................... 366/130
2003/0002385 A1 * 1/2003 Pola et al. ................... 366/130
2005/0135186 A1 * 6/2005 Mbakop ..................... 366/101
2007/0181580 A1 * 8/2007 Kimura et al. ............. 220/304

* cited by examiner

*Primary Examiner*—Charles E Cooley

(57) ABSTRACT

An egg beater includes a base having an accommodating chamber fixed therein with a positioning projection and having its outer upper edge disposed with an engage groove having its lower side bored with an annular recess. A stirrer is installed in the accommodating chamber of the base, having its upper side provided with a whisking member and its underside bored with an insert groove. A waterproof washer is fitted around the engage groove of the base, and an upper cover is mounted on the base and has its inner wall bored with an annular recess. In using, open the upper cover and knock an egg against the whisking member to let the egg liquid flow into the accommodating chamber, and then fix the upper cover on the base and hold the base and the upper cover with hands and shake them in directions up and down or left and right.

4 Claims, 5 Drawing Sheets

EGG BEATER

BACKGROUND OF THE INVENTION

1. Field of the Invention

This invention relates to an egg beater, particularly to one able to evenly beat egg liquid conveniently and quickly.

2. Description of the Prior Art

Conventionally, to beat an egg, firstly, it is usual to prepare a container and knock the eggshell against a hard object to deposit the egg liquid in the container, and then beat the egg liquid in the container with chopsticks. However, beaten with chopsticks, egg liquid can hardly be beaten completely and evenly. Hand egg beaters and electric egg beaters sold on the market can solve such a problem. A conventional hand egg beater 1, as shown in FIG. 1, is to have egg liquid deposited in a container 11, and then hold the container 11 with one hand and grasp the egg beater 1 with the other to beat the egg liquid 10 in the container 11 vertically. Although the conventional hand egg beater 1 can evenly beat the egg liquid, yet it will take much time and labor to finish such work, and in the course of beating egg liquid, the egg liquid 10 is likely to be slashed out of the container 11 in case of applying force improperly or excessively. A conventional electric egg beater can beat egg liquid with less time and labor indeed, but during beating egg liquid, the egg liquid still may be splashed out of a container, and if the electric egg beater is used for beating only one egg at one time, it will squander away energy source, thus not conforming to economic gain.

SUMMARY OF THE INVENTION

The objective of this invention is to offer an egg beater able to evenly beat egg liquid conveniently and quickly.

The egg beater in the present invention includes a base, a stirrer, a waterproof washer and an upper cover. The base is formed with an accommodating chamber having a positioning projection fixed therein and has the upper edge of its outer wall disposed with an engage groove having its lower side bored with an annular recess. The stirrer is installed in the center of the accommodating chamber of the base, having its upper side provided with a whisking member and its underside bored with an insert groove. The waterproof washer is fitted around the engage groove of the base, and the upper cover is mounted on the base and has its inner wall bored with an annular recess at its bottom.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
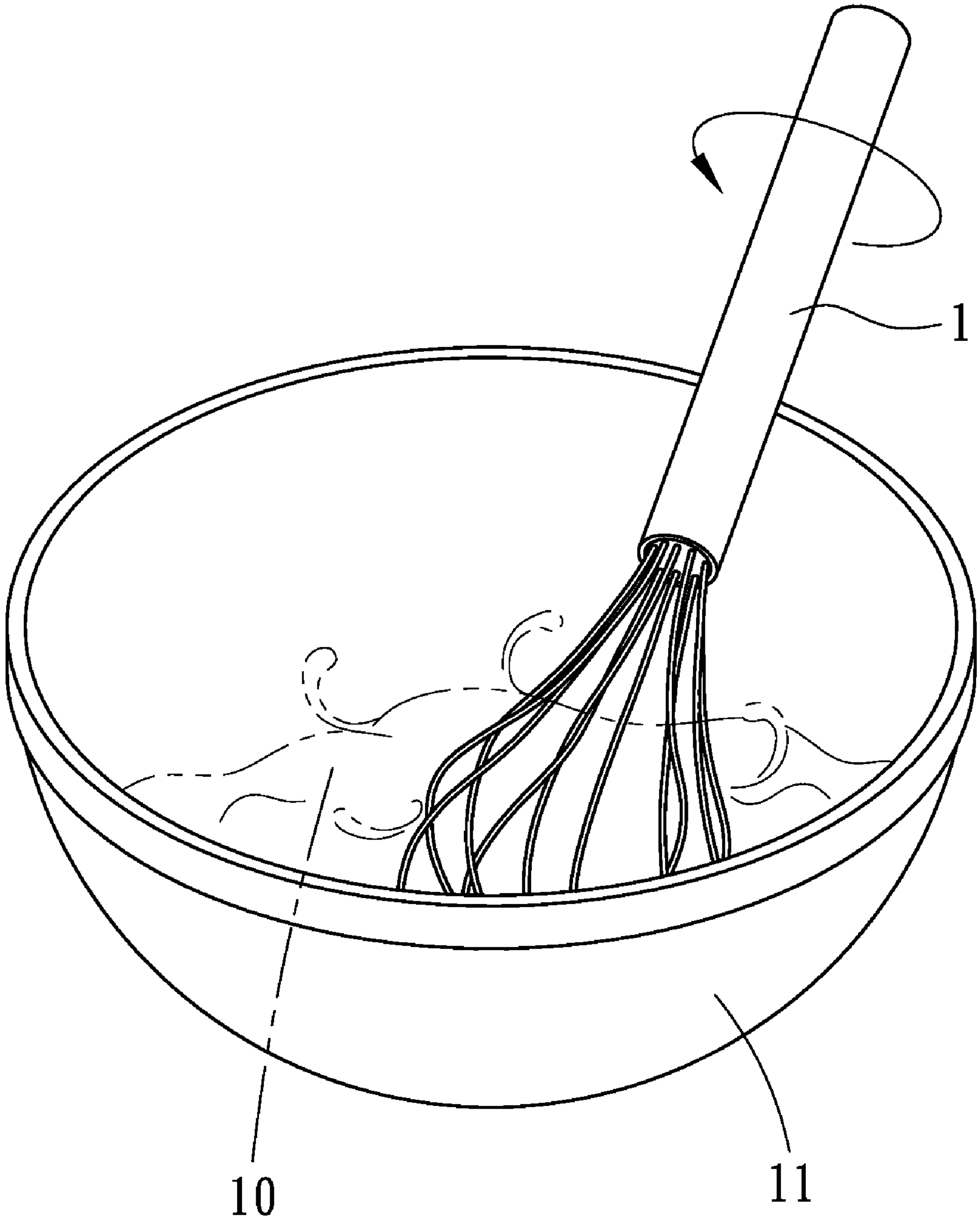
FIG.1 (PRIOR ART)
FIG. 1 is a perspective view of a conventional hand egg beater in a condition of whisking egg liquid.
Figure 2:
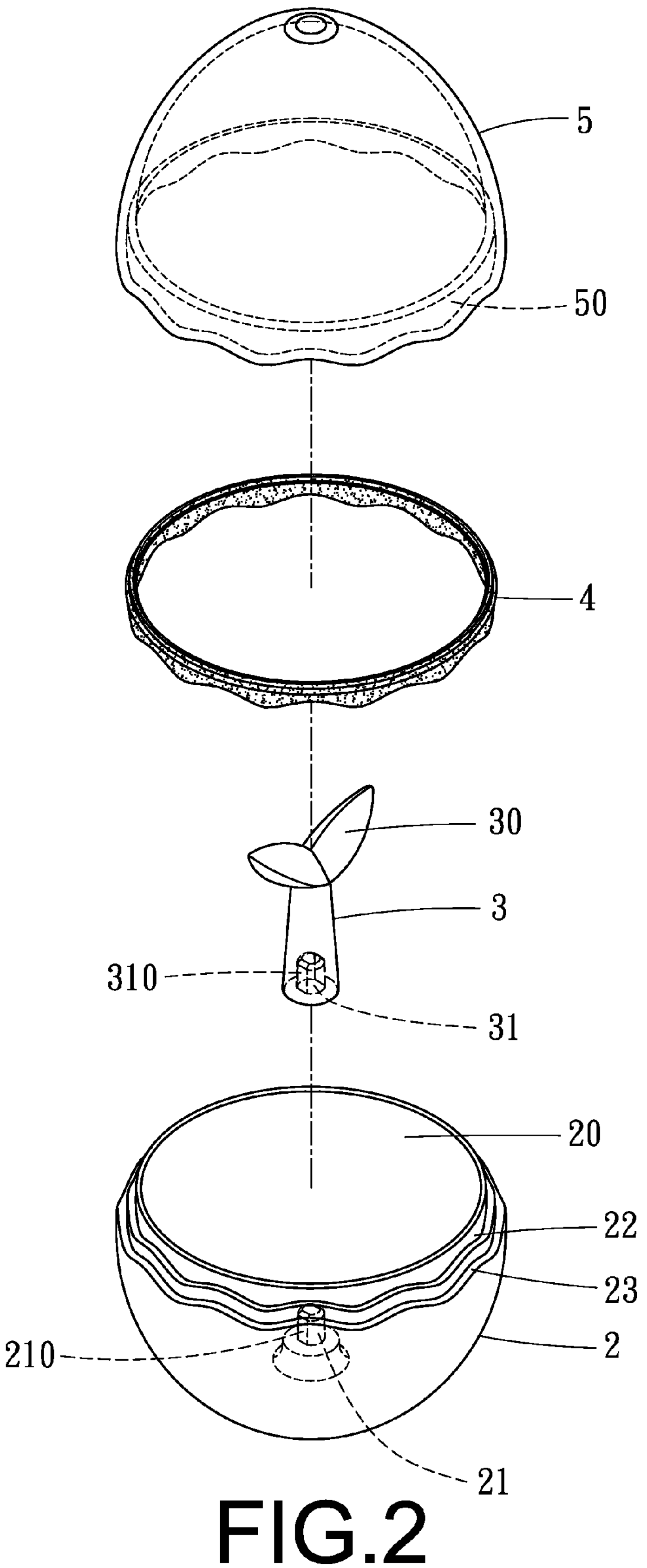
FIG. 2 is an exploded perspective view of an egg beater in the present invention.

A preferred embodiment of an egg beater in the present invention, as shown in FIG. 2, includes a base 2, a stirrer 3, a waterproof washer 4 and an upper cover 5 combined together.

The base 2 is formed with an accommodating chamber 20 fixed therein with a positioning post 21 having its outer wall oppositely provided with tangent planes 210. The base 2 further has the upper edge of its outer wall bored with an engage groove 22 having its lower side disposed with an annular recess 23.

The stirrer 3 firmly installed in the accommodating chamber 20 of the base 2 has its upper side provided with a branch-leave-shaped whisking member 30 and its underside bored with an insert groove 31 having its inner wall oppositely provided with tangent planes 310.

The waterproof washer 4 is fitted around the engage groove 22 of the base 2.

The upper cover 5 is preferably semispherically-shaped, to be mounted on the base 2, having its inner wall disposed with an annular recess 50.

Figure 3:
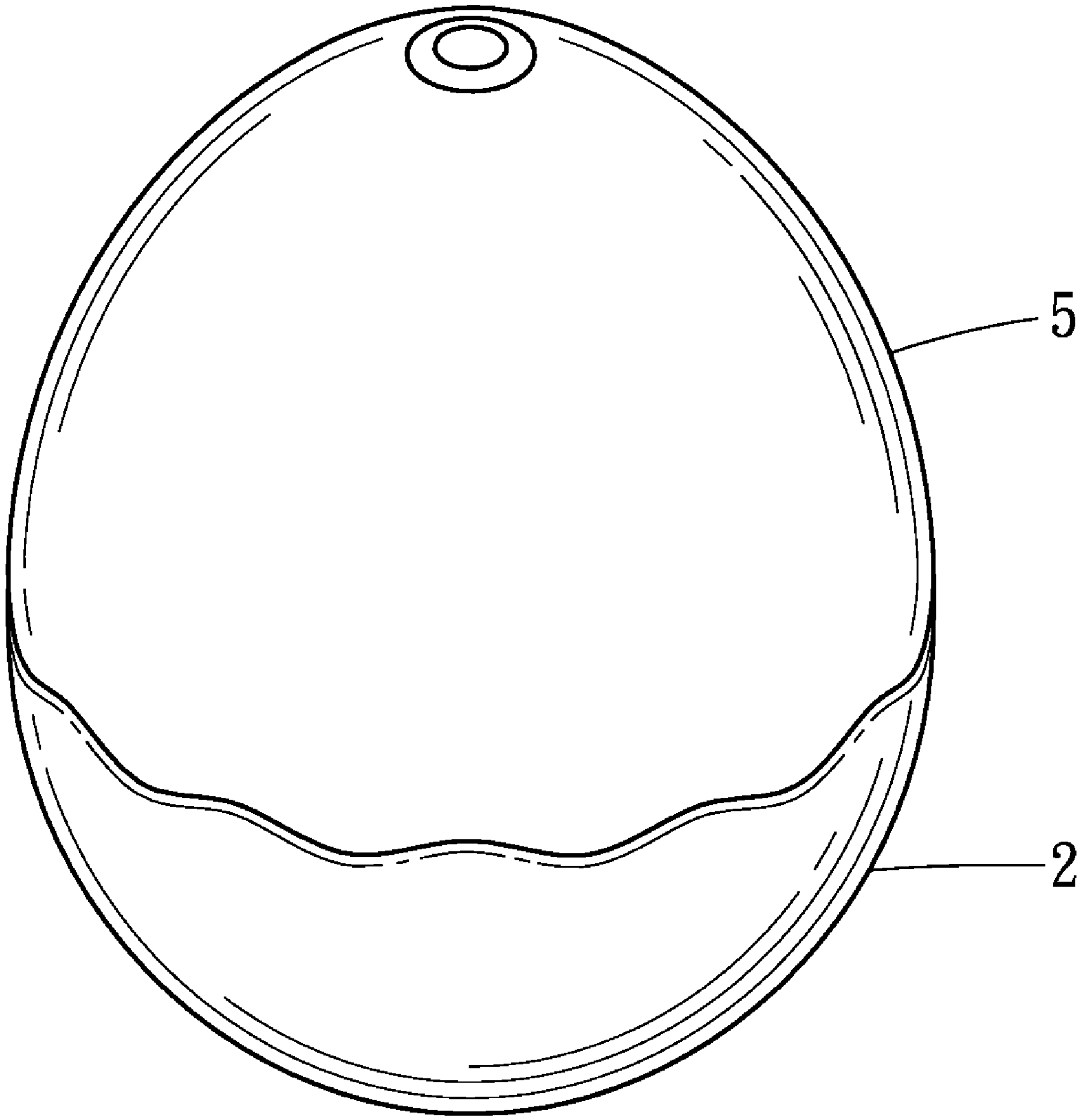
FIG. 3 is a perspective view of the egg beater in the present invention.

In assembling, referring to FIGS. 2 and 3, firstly, the stirrer 3 is installed in the accommodating chamber 20 of the base 2, letting the positioning post 21 in the accommodating chamber 20 inserted in the insert groove 31 in the underside of the stirrer 3. Restricted by mutual engagement of the tangent planes 210 on the outer wall of the positioning post 21 and the tangent planes 310 on the inner wall of the insert groove 31, the stirrer 3 can stably and immovably be positioned in the accommodating chamber 20. Next, the waterproof washer 4 is fitted around the engage groove 22 of the base 2, and then the upper cover 5 is covered on the annular recess 23 of the base 2, letting the waterproof washer 4 closely fixed between the annular recess 50 of the upper cover 5 and the engage groove 22 of the base 2, thus finishing assembly of the egg beater.

Figure 4:
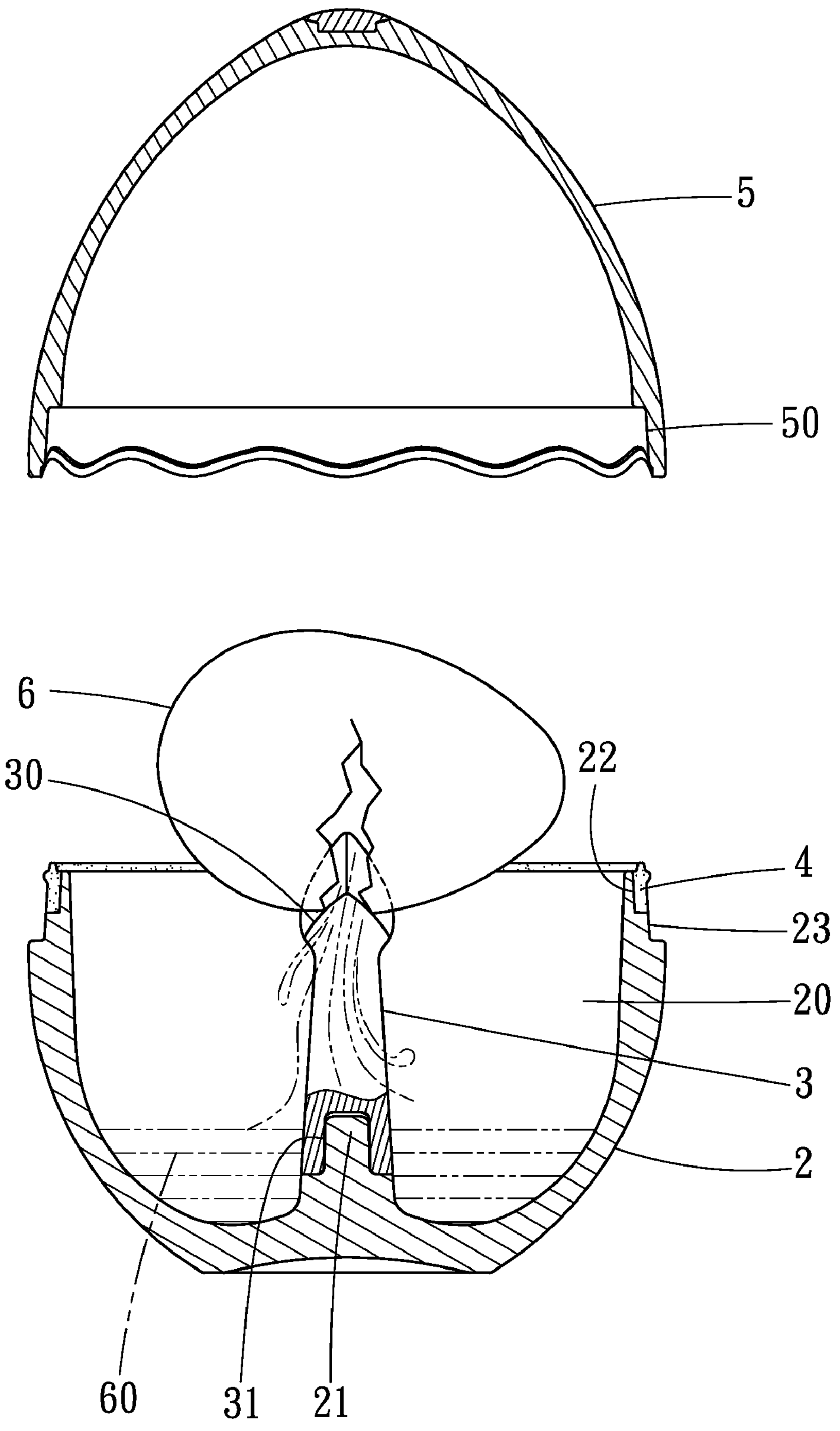
FIG. 4 is a cross-sectional view of the egg beater in a using condition in the present invention.
Figure 5:
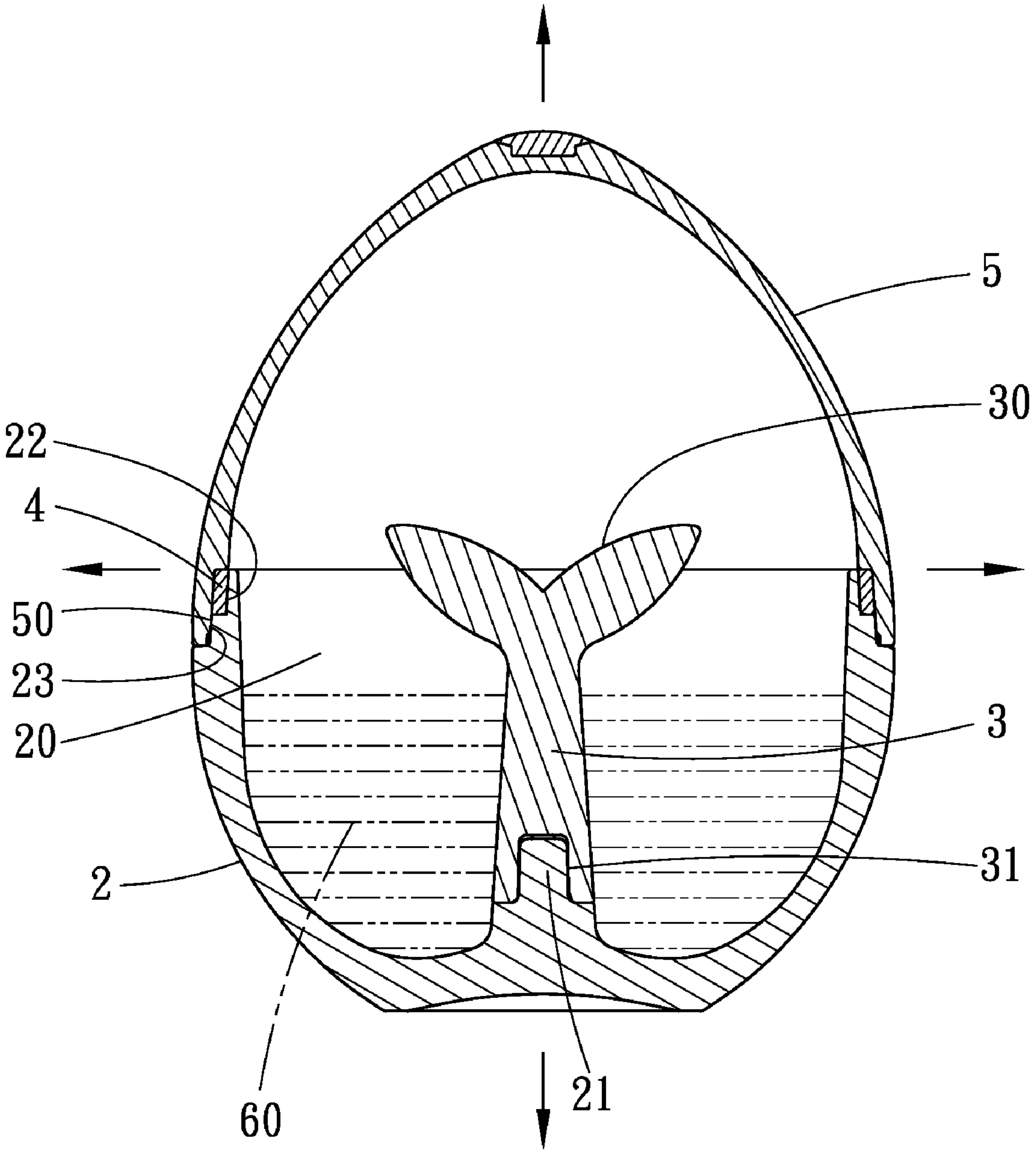
FIG. 5 is a cross-sectional view of the egg beater being shaken in directions up and down or left and right in the present invention.

In using, referring to FIGS. 3 and 4, firstly, remove the upper cover 5 from the base 2 and knock an egg 6 against the whisking member 30 of the stirrer 3 to break the eggshell and let the egg liquid 60 flow into the accommodating chamber 20 of the base 2. Subsequently, fix the upper cover 5 on the base 2 to let the waterproof washer 4 closely positioned between the annular recess 50 of the upper cover 5 and the engage groove 22 of the base 2. Then, hold the base 2 and the upper cover 5 with hands and repeatedly shake the whole egg beater in directions up and down or left and right to let the egg liquid 60 in the accommodating chamber 20 of the base 2 thoroughly whisked by the leaves-shaped stirrer 3 in the accommodating chamber 20. At this time, the waterproof washer 4 closely fixed between the upper cover 5 and the base 2 will function to prevent the egg liquid from seeping out of the jointed portion of the upper cover 5 and the base 2. After the egg beater is shaken completely, remove the upper cover 5 from the base 2 and the egg liquid 60 evenly whisked can be poured out for use from the accommodating chamber 20 of the base 2. By so designing, the egg beater of this invention can effectively prevent egg liquid 60 from splashing out of the base 2 when the egg liquid is whisked, able to quickly and evenly whisk eggs with less labor.

While the preferred embodiment of the invention has been described above, it will be recognized and understood that various modifications may be made therein and the appended claims are intended to cover all such modifications that may fall within the spirit and scope of the invention.

What is claimed is:

1. An egg beater comprising:

a base (2) formed with an accommodating chamber (20); a positioning post (21) being projected from a bottom wall of the accommodating chamber (20) and having an outer wall formed with planes (210); an upper edge of an outer wall of the base (2) being formed with an annular engage groove (22) having a lower wall; an annular recess (23) being formed at an outer wall of the base and being below a lower wall of the engage groove (22);

a stirrer (3) firmly installed in the accommodating chamber (20) of the base (2); an upper side of the stirrer (3) being provided with a whisking member (30) and a lower side of the stirrer being formed with an insert groove (31); an inner wall of the stirrer being formed with planes (310);

a waterproof washer (4) being engageable with the engage groove (22) of the base (2), but not in contact the annular recess (23);

an upper cover (5) having a semi-spherical shape, and being mountable upon the base (2) by an inner wall thereof disposed with an annular recess (50);

in assembling the egg beater, the stirrer (3) is installed in the accommodating chamber (20) of the base (2) by the positioning post (21) in the accommodating chamber (20) inserted in the insert groove (31) of the underside of the stirrer (3) by mutual engagement of the planes (210) of the outer wall of the positioning post (21) and the planes (310) of the inner wall of the insert groove (31), the stirrer (3) can stably and immovably be positioned in the accommodating chamber (20); then, the waterproof washer (4) is fitted around the engage groove (22) of the base (2), and then the upper cover (5) is covered on the annular recess (23) of the base (2), causing the waterproof washer (4) closely fixed between the annular recess (50) of the upper cover (5) and the engage groove (22) of the base (2).

2. The egg beater as claimed in claim 1, wherein said whisking member at the upper side of said stirrer is leaves-shaped.

3. The egg beater as claimed in claim 1, wherein said egg beater has an egg-like outlook.

4. The egg beater as claimed in claim 1, wherein a lower edge of the upper cover (5) has a curved shape and a lower side of the annular recess (23) has a curved shape which is matched to the curved shape at the lower edge of the upper cover.

* * * * *